(12) United States Patent
Benedetto et al.

(10) Patent No.: US 8,934,750 B2
(45) Date of Patent: Jan. 13, 2015

(54) SUPPORT FOR AT LEAST ONE CASSETTE

(75) Inventors: Adrian Benedetto, Berlin (DE); Oliver Hartmann, Potsdam (DE); Frank Mössner, Berlin (DE); Michael Sielaff, Erwitte (DE); Thomas Fischer, Rackwitz/Zschortau (DE)

(73) Assignee: Tyco Electronics Services GmbH, Schaffhausen (CH)

( * ) Notice: Subject to any disclaimer, the term of this patent is extended or adjusted under 35 U.S.C. 154(b) by 115 days.

(21) Appl. No.: 13/576,584

(22) PCT Filed: Nov. 2, 2010

(86) PCT No.: PCT/EP2010/006671
§ 371 (c)(1),
(2), (4) Date: Aug. 1, 2012

(87) PCT Pub. No.: WO2011/091823
PCT Pub. Date: Aug. 4, 2011

(65) Prior Publication Data
US 2012/0301098 A1   Nov. 29, 2012

(30) Foreign Application Priority Data
Feb. 1, 2010   (DE) .......................... 10 2010 006 611

(51) Int. Cl.
*G02B 6/00* (2006.01)
*G02B 6/44* (2006.01)
*H04Q 1/06* (2006.01)
*H04Q 1/02* (2006.01)

(52) U.S. Cl.
CPC ................ *G02B 6/4455* (2013.01); *H04Q 1/06* (2013.01); *H04Q 1/021* (2013.01)

USPC .......................................................... 385/135

(58) Field of Classification Search
USPC .................................................. 385/134–137
See application file for complete search history.

(56) References Cited

U.S. PATENT DOCUMENTS 5,363,466 A * 11/1994 Milanowski et al. ......... 385/135
5,751,882 A *  5/1998 Daems et al. ................. 385/135
6,009,224 A * 12/1999 Allen ............................ 385/135

(Continued)

FOREIGN PATENT DOCUMENTS

DE       103 14 262     6/2004
WO       WO 99/47960    9/1999
WO       WO 00/65397    11/2000

OTHER PUBLICATIONS

International Search Report for International Application No. PCT/EP2010/006671 mailed Feb. 21, 2011.

*Primary Examiner* — Daniel Petkovsek
(74) *Attorney, Agent, or Firm* — Merchant & Gould P.C.

(57) ABSTRACT

The invention relates to a holder (1) for at least one cassette, with the holder (1) having at least one shaft holder (100), at least one shaft element (200, 250) and at least one cassette, with the at least one cassette being attached to the shaft element (200, 250) such that it can pivot about a pivoting axis, with the at least one shaft element (200, 250) being attached to the shaft holder (100), with the at least one shaft element (200, 250) having a guidance channel (212, 212a; 253, 253a; 254, 254a), with the guidance channel (212, 212a; 253, 253a; 254, 254a) running at least partially parallel to the pivoting axis, with the cassette having at least one element (515, 515a) for rotatable mounting, wherein at least one element (515, 515a) is mounted, for rotatable mounting, such that it can rotate on the at least one shaft element (200, 250).

8 Claims, 11 Drawing Sheets

(56) References Cited

U.S. PATENT DOCUMENTS

| | | |
|---|---|---|
| 6,192,180 B1 * | 2/2001 | Kim et al. ............... 385/135 |
| 6,275,641 B1 | 8/2001 | Daoud |
| 6,418,266 B1 * | 7/2002 | Vitantonio ............... 385/135 |
| 6,504,986 B1 * | 1/2003 | Wambeke et al. .......... 385/134 |
| 7,200,314 B2 * | 4/2007 | Womack et al. ........... 385/135 |
| 7,333,706 B2 * | 2/2008 | Parikh et al. ............. 385/135 |
| 7,418,184 B1 * | 8/2008 | Gonzales et al. .......... 385/135 |
| 7,697,812 B2 * | 4/2010 | Parikh et al. ............. 385/135 |
| 8,655,136 B2 * | 2/2014 | Trebesch et al. .......... 385/135 |
| 2004/0120681 A1 | 6/2004 | Bohle et al. |

* cited by examiner

SUPPORT FOR AT LEAST ONE CASSETTE

BACKGROUND

This application is a National Stage Application of PCT/EP2010/006671, filed 2 Nov. 2010, which claims benefit of Serial No. 10 2010 006 611.7, filed 1 Feb. 2010 in Germany and which applications are incorporated herein by reference. To the extent appropriate, a claim of priority is made to each of the above disclosed applications.

The invention relates to a holder for at least one cassette for structured deposition and handling of optical waveguides and of optical-waveguide splice connections.

Apparatuses for structured deposition and handling of optical waveguides and of optical-waveguide splice connections are used in cable networks, in particular in network technology. They are used in particular to protect splice connections at connection points between two optical waveguides.

They are also used, for example, for deposition, branching or splitting of optical waveguides from multifiber units, which comprise a plurality of optical waveguides. A plurality of multifiber units may in this case be combined to form a multifiber unit cable.

When depositing and handling optical waveguides, multifiber units and/or multifiber unit cables, care must be taken to ensure that there is no negative adverse influence on the transmission characteristics of the optical waveguides. Particular attention must be paid to compliance with minimum bending radii. Attention must also be paid to ensuring that the position of an optical waveguide or of multifiber units, once deposited, changes as little as possible during handling, for example when working on the optical waveguides. This likewise makes it possible to maintain the transmission characteristics of the optical waveguides.

For structured deposition of optical waveguides, DE 103 14 262 A1 discloses an apparatus having a frame and having a plurality of splice cassettes, with a plurality of splice cassettes in each case being arranged one above the other, and being attached to the frame such that they can pivot, on a front face and on a rear face of the frame. Fiber guidance elements for optical waveguide fibers are attached to at least one vertically running narrow face of the frame, such that the optical waveguide fibers are guided at the side alongside the splice cassettes and the frame, in the area of the or each narrow face. The document furthermore discloses that optical waveguide fibers are guided by cylindrical shaft bodies of the splice cassettes such that an insertion direction of the optical waveguide fibers into a splice cassette runs approximately parallel to a pivoting axis of the respective splice cassette, and such that the cylindrical shaft body of the respective splice cassette is axially slotted such that the optical waveguide fibers can be inserted into the cylindrical shaft body through an opening, in the radial direction.

This raises the technical problem of designing a holder for at least one cassette, which is used for structured deposition and simple handling of optical waveguides and/or multifiber units, which minimizes any change in the position of an optical waveguide or of multifiber units during handling once they have been deposited, without any negative influence on the transmission characteristics of the optical waveguides during handling.

SUMMARY

The invention proposes a holder for at least one cassette. The holder comprises at least one cassette. The cassette is in this case used for structured deposition of optical waveguides, in particular of glass fibers, pigtails and patchcords.

In the following text, a connection means an interlocking, force-fitting or integral connection. In this case, a connection may be detachable or non-detachable.

A connection of a first object to a second object can in this case generally be produced by an attachment element or connecting element of the first object, and an attachment element or connecting element of the second object corresponding to this attachment element or connecting element of the first object. In this case, the interlocking, force-fitting or integral connection can be produced by means of the attachment or connecting element.

In the following text, detachable connections refer in particular to a latching connection, but also to plug connections, screw connections and a further detachable connection which a person skilled in the art chooses as appropriate from the detachable connections known to him.

With regard to a latching connection, the following text is based on the assumption that, in a general form, a latching connection can be produced between a latching element and a corresponding latching holder. The latching element and the corresponding latching holder are therefore a specific embodiment of attachment or connecting elements. In this case, the latching element may, for example be in the form of a latching tab or latching tongue, or else a sprung latching tongue. In this case, for example, the latching holder may be a latching slot and/or a latching opening and/or a latching depression and/or a latching limb.

In this case, the cassette may be a so-called term cassette. A term cassette is used to hold, attach and guide elements and optical waveguides, by means of which contact can be made with individual optical waveguides from the outside in a defined manner, in particular by means of a plug connection. At least one cable can be inserted into a term cassette. Furthermore, the term cassette may have a holder for at least one adapter. The term cassette may also form the holder, for example when the term cassette is manufactured as an integral injection-molded part. The following text is based on the assumption that the term "have" also covers the term "form".

Two identical plugs or plugs of different type can be connected by means of the adapter. A plug is in this case an end contact of an optical waveguide. In this case, plugs may be so-called DIN plugs, ST plugs, E2000 plugs, LC plugs, SC plugs, Duplex-SC plugs, MTRJ plugs or FC plugs.

The holder for the at least one adapter may in this case be detachably connectable to the term cassette. In this case, the term cassette may have an element for attachment of the holder. This advantageously means that a term cassette can be fitted in a modular form with holders for different types of adapters, or further optical waveguide technology elements.

In particular, the term cassette is used to produce a desired connection for glass fibers by means of the plugs mentioned above. For example, a cable can be inserted into the term cassette for this purpose. By way of example, the optical waveguides in the cable are then separated from this cable by means of a so-called fan-out element. The separated cores can then be fitted with a desired type of plug. Furthermore the term cassette can be fitted with adapters. In this case, the adapters are arranged such that a first adapter interface is accessible on the cassette side, and a second adapter interface is accessible from outside the term cassette. In this case, the separated optical waveguides which have been fitted with desired plugs can be inserted into the first adapter interface on the cassette side. In order to make contact with or connect a desired optical waveguide, a plug of a further optical waveguide can therefore be inserted into the adapter interface which corresponds to the first adapter interface and is accessible from outside the term cassette. In this case, a term cassette may have at least one element for attachment of a fan-out element.

Furthermore, the term cassette may have at least one element for guidance of optical waveguides. At least one section of the element for guidance may in this case be circular, with a radius of the section being at least a minimum bending radius of the optical waveguides. The element for guidance of optical waveguides may in this case also be used for spatial separation of individual optical waveguides. The element for guidance may in this case be in the form of a guide rib. This advantageously ensures that a minimum bending radius of the optical waveguides is complied with, as a result of which there is no negative influence on the transmission characteristics of the optical waveguides.

Alternatively, the cassette may be a splice cassette. In this case, cables, cores or one or more optical waveguides can be inserted into a splice cassette. Like the term cassette, the splice cassette may have at least one element for guidance of optical waveguides. At least one section of the element for guidance may in this case be circular, with a radius of the section being at least a minimum bending radius of the optical waveguides. The element for guidance of optical waveguides may in this case also be used for spatial separation of individual optical waveguides. The element for guidance may in this case be in the form of a guide rib, a guidance channel or a guide body which is raised above the bottom of the splice cassette.

In particular, one or more elements for guidance of optical waveguides may be used as a repository for excess lengths of the optical waveguides. A repository such as this may, for example, comprise a plurality of guidance channels and/or guide bodies and/or guide ribs, with a profile of the guide ribs and/or a profile of the guidance channels and/or a contour of the guide bodies defining one or more at least partially circular or oval guides, with a radius of a circular or oval guide corresponding at least to a minimum bending radius of the optical waveguides.

In this case, the guidance channels and/or guide bodies and/or guide ribs may be arranged with respect to one another such that a plurality of circular guides merge tangentially into one another in defined areas. A radius with curvature change can then be implemented for the optical waveguide fibers in these areas. This advantageously ensures that a minimum bending radius of the optical waveguides is complied with, as a result of which there is no negative influence on the transmission characteristics of the optical waveguides.

Furthermore, the splice cassette may have at least one splice holder for attachment and defined deposition of a splice connection in the splice cassette.

Alternatively, the cassette may be a so-called combined term-splice cassette. A term-splice cassette has the functionalities of a term cassette and of a splice cassette at the same time. Reference is in this case accordingly made to the statement relating to the elements of the term cassettes and the elements of the splice cassettes.

In one preferred embodiment, the combined term-splice cassette comprises a term cassette as described above and a splice cassette as described above, with the term cassette being detachably connected to the splice cassette. In particular, at least a part of the term cassette can be arranged under the splice cassette in the combined term-splice cassette. The arrangement of the term cassette under the splice cassette in this case means that at least a part of an upper face of the term cassette is adjacent to or rests on at least a part of a lower face of the splice cassette.

Particularly in this embodiment, but not exclusively for this embodiment, a bottom surface of the splice cassette may have at least one opening. In the case of a combined term-splice cassette, this advantageously allows optical waveguides to be passed through this opening from the upper splice cassette to the lower term cassette. This advantageously means that an optical waveguide need not first of all be passed out of the splice cassette, guided outside the splice cassette, and then inserted into the term cassette, which, because of the minimum bending radius, would necessitate a considerably greater length of the optical waveguide, and therefore a greater amount of space being required for the holder.

By way of example, the term cassette may be detachably connected to the splice cassette via a latching connection. For this purpose, for example, one outer surface of a side wall of the term cassette may have at least one latching element. An outer surface of one side wall of the splice cassette may also have at least one latching element. Furthermore, a separate latching element may have latching holders into which the latching elements of the term cassette and of the splice cassette can be latched. In this case, the latching holders are arranged with respect to one another such that, when the latching elements of the term cassette and of the splice cassette are latched to the latching element, the term cassette is at least partially arranged under the splice cassette.

The latching element may, of course, also have latching elements, and the term cassette and the splice cassette may have the corresponding latching holders. It is also feasible for the term cassette to have the latching element and/or a latching holder, and for the splice cassette to have the corresponding latching holder and/or the corresponding latching element.

In this case, a combined term-splice cassette can be configured in advance. In this case, for example, a holder for adapters of the term cassette can be fitted with adapters. Plugs to which separated optical waveguides are connected are inserted into a first adapter interface on the cassette side. The separated optical waveguides are therefore associated with one specific adapter. Furthermore, the separated optical waveguides are inserted into the splice cassette through the at least one opening in the bottom surface of the splice cassette. These optical waveguides can be connected via splices in the splice cassette with further optical waveguides (input optical waveguides), which are inserted therein from outside the splice cassette. In this case, the splice cassette is accessible from an upper face of the splice cassette, thus allowing splicing and attachment of splice connections. If a plug with a connected optical waveguide (output optical waveguide) is now inserted into a second adapter interface, which is accessible from outside the term cassette, then a connection is produced between a desired input optical waveguide and a desired output optical waveguide. The preconfigured term-splice cassette therefore advantageously allows contact to be made with specific optical waveguides by means of a plug connection, with the contact in the splice cassette of the term-splice cassette being configurable on a user-specific basis by means of the splicing. The combined term-splice cassette represents an autonomous invention, even without the holder.

Furthermore, the holder has at least one shaft holder and at least one shaft element. The shaft element is in this case attached to the shaft holder.

The shaft holder may in this case, for example, be a rectangular holding plate.

In one preferred embodiment, the shaft holder is detachably connected to the shaft element. For this purpose, the shaft holder may have latching holders and the shaft element may have latching elements which correspond to these latching holders, or vice versa.

The shaft element may in this case have at least one, but preferably two, shaft parts. In this case, the shaft parts may have a circular cross section. A common central longitudinal axis of the shaft parts in this case defines a pivoting axis. The shaft parts can in this case be connected via a connecting plate, in particular a rectangular connecting plate, with the shaft parts being connected to the connecting plate via webs such that the longitudinal axis of the shaft parts runs parallel to the connecting plate, and the shaft parts are at a distance from the connecting plate.

Furthermore, the shaft element, in particular the at least one shaft part, has a guidance channel, which is at least partially surrounded by the shaft element or the shaft part. The guidance channel preferably runs along the central longitudinal axis of the at least one shaft part. The guidance channel therefore runs parallel to the pivoting axis. By way of example, the at least one shaft part may be at least partially in the form of a hollow cylinder. In this case, the guidance channel may run along an entire longitudinal extent of the shaft element or of the shaft part. In this case, one end face of the shaft element or of the shaft part may in each case have openings through which the guidance channel is accessible. If the shaft element or the shaft part is hollow-cylindrical, then the openings are arranged on the end faces of the hollow cylinder. By way of example, optical waveguides or multifiber units can be inserted into the guidance channel, and passed out from it, through these openings. The openings through which optical waveguides are inserted into or passed out from the guidance channel are also referred to in the following text as inlet/outlet openings of the guidance channel.

Furthermore, the cassette has at least one element for rotatable mounting. The elements for rotatable mounting are preferably arranged on one end face of a cassette. Furthermore, the end face of a cassette has an inlet/outlet opening for insertion of optical waveguides or multifiber units into the cassette, or for removing them from the cassette.

According to the invention, the at least one element for rotatable mounting of the cassette is mounted rotatably on the at least one shaft element, in particular on the shaft parts.

In this case, inlet/outlet openings of the guidance channel and the inlet/outlet opening of the cassette are arranged such that optical waveguides and/or multifiber units can run from the outside through an inlet/outlet opening into the guidance channel, through the guidance channel, through an inlet/outlet opening out of the guidance channel, through the inlet/outlet opening of the cassette into the cassette, while maintaining the minimum bending radius, when the cassette is attached to the at least one shaft element. In the same way, optical waveguides and/or multifiber units can be passed out of the cassette while maintaining the minimum bending radius.

In particular, the cassette may have elements for rotatable mounting which are at least partially hollow-cylindrical. In this case, an internal diameter of the hollow cylinders on the cassette side is equal to or greater by a predetermined amount than an external diameter of the hollow cylinders on the shaft element side. A hollow cylinder on the shaft element side can therefore be inserted or plugged into the cavity in a hollow cylinder on the cassette side.

The at least one cassette can in this way be attached to the shaft element such that it can pivot about the pivoting axis. When the cassette carries out a pivoting movement, then the hollow cylinder on the cassette side can rotate about the hollow cylinder on the shaft element side, without the hollow cylinder on the shaft element side carrying out any rotary movement, that is to say it remains stationary (stationary shaft).

At least one optical waveguide and/or one multifiber unit can be guided in the at least one guidance channel. In this case, by way of example, an optical waveguide which runs outside a cassette is inserted or introduced into the guidance channel.

The proposed holder advantageously allows a cassette to rotate about a pivoting axis, with a guidance channel not rotating or being stationary. A rotational movement of a cassette therefore also does not influence the position of an optical waveguide which is guided in the guidance channel, as a result of which the transmission characteristics of the optical waveguide are not influenced in a negative manner by the rotation.

In contrast to the proposed holder, DE 103 14 262 A1 discloses the element on the cassette side for rotatable mounting being mounted in and not on the shaft element, in particular in the shaft parts. In this case, the element on the cassette side for rotatable mounting has a hollow cylindrical guidance channel. When the cassette is rotating about a pivoting axis, the guidance channel therefore likewise rotates, and is not stationary. A rotational movement can therefore influence the position of an optical waveguide which is guided in the guidance channel.

In one preferred embodiment, the at least one cassette is detachably attachable to the at least one shaft element, but in this case the attachment element must ensure, when it is in an attached state, that the cassettes can pivot about the pivoting axis. This advantageously means that a shaft element can be fitted with different cassettes, and can therefore be used in a modular form.

For this purpose, the shaft holder may have latching holders and the shaft element may have latching elements which correspond to these latching holders, or vice versa.

In one preferred embodiment, a circumferential profile of a shaft element or a circumferential profile of the at least one shaft part has at least one opening. The opening may be in the form of a slot in the direction of a longitudinal extent along the shaft element or shaft part. The opening preferably extends along an entire longitudinal extent of the shaft element or shaft part. The opening, in particular the slot, furthermore preferably runs parallel to the pivoting axis. The guidance channel is accessible through the opening from outside the shaft element or shaft part. If the shaft element or the shaft part is hollow-cylindrical, then the opening is arranged on an envelope surface of the hollow cylinder. By way of example, optical waveguides or multifiber units can be inserted into the guidance channel or removed from it through these openings. If the shaft element or the shaft part is hollow-cylindrical, then the circumferential profile is circular. In this case, the opening may correspond to a circular arc with a predetermined center-point angle (opening angle), for example of 90 degrees or 180 degrees.

Furthermore, a circumferential profile of the element for mounting is also preferably at least partially open. The opening may likewise be in the form of a slot in the direction of a longitudinal extent along the element for mounting. The opening preferably extends along an entire longitudinal extent of the element for mounting. Furthermore, this opening, in particular the slot, preferably also runs parallel to the pivoting axis. The element for mounting can be plugged or latched onto the shaft element or the shaft part by means of this opening, and can thus be detachably connected to the shaft element.

Furthermore, the opening in the circumferential profile of the element for mounting is preferably designed such that, in a plugged-on or latched-on basic state, the opening in the circumferential profile of the element for mounting is at least partially coincident with the opening in the circumferential profile of the shaft element or of the shaft part. The guidance channel is therefore accessible from the outside through the opening in the circumferential profile of the element for mounting and the opening in the circumferential profile of the shaft element or of the shaft part, in the basic state.

Furthermore, the opening in the circumferential profile of the element for mounting is preferably designed such that the circumferential profile of the element for mounting closes or covers the opening in the circumferential profile of the shaft element or of the shaft part when a cassette which has been plugged or latched on by means of the element for mounting is rotated or pivoted away from the basic state. This prevents an optical waveguide from sliding out of the guidance channel when the cassette is pivoted away from the basic state.

If the element for mounting is also hollow-cylindrical, then the opening is arranged on an envelope surface of the hollow cylinder. In this case, the circumferential profile of the element for mounting is circular. In this case, the opening may correspond to a circular arc with a predetermined center-point angle, with the opening angle preferably being less than 180 degrees, for example in an interval from 90 degrees to 179 degrees. If the opening in the hollow-cylindrical element for mounting is at least partially coincident with the opening in the hollow-cylindrical shaft element or shaft part, then, for example, optical waveguides or multifiber units can be inserted into or removed from the guidance channel through these openings.

If the shaft element or shaft part and the element for mounting are hollow-cylindrical, then a center line of the circular arc which runs through a center point of the circular arc radially outwards intersects a base area of the shaft holder at a predetermined angle when the shaft element is attached to the shaft holder and the cassette is attached to the shaft element in the basic state. In this case, the predetermined angle may be in an angle interval from, for example, 1 to 89 degrees. The predetermined angle is preferably 45 degrees or is close to 45 degrees, for example between 30 and 60 degrees. In this case, the predetermined angle does not relate to areas where additional hold-down devices are arranged.

In this case, the shaft element or the shaft part may have areas along the longitudinal extent in which an opening angle of the opening is less than an opening angle of the opening outside these areas. These areas form hold-down devices which form a constriction to the opening in the shaft element or the shaft part and make it harder for optical waveguides or multifiber units which have been inserted into the guidance channel to slide out. The opening angle in the area of the hold-down devices is preferably half as great as the opening angle in the area away from the hold-down devices.

Furthermore, the shaft element or the shaft part preferably has a plurality of hold-down devices, which constrict the opening in the shaft element or in the shaft part alternately toward a first edge of the opening of the shaft element or of the shaft part, and toward a second edge of the opening of the shaft element or of the shaft part.

In a further embodiment, at least one outer face of the at least one cassette has at least one attachment element. At least one element for cable guidance can be attached to the at least one outer face by means of the attachment element. In addition, on the outer face, the attachment element may be the attachment element for connection of a term cassette to a splice cassette, in order to form a combined term-splice cassette. The attachment element may also be a universal attachment element, by means of which elements for glass fiber technology, for example holders, adapters, strain-relief devices and further elements, can be attached to the cassette. This advantageously means that a cassette can be configured for desired deposition of optical waveguides or multifiber units.

In a further embodiment, the at least one shaft holder has at least one attachment element. The at least one shaft holder and therefore the proposed holder can be attached to a holding element by means of this attachment element. By way of example, the holding element may be a bottom plate or a base box.

Furthermore, the shaft holder can also be connected to the holding element via a coupling element. In this case, the shaft holder is attached to the coupling element by means of the attachment element. The coupling element in turn has an attachment element, in which case the coupling element can be attached to the holding element by means of this attachment element. The coupling element is preferably designed such that a shaft holder which is attached to the coupling element assumes a predetermined inclination with respect to a bottom plate or a bottom surface of a base box. By way of example, the inclination may be 45 degrees. If the holder according to the invention is attached for example to a bottom plate or a bottom surface of a base box directly by means of the shaft holder or via a coupling element, then the guidance channel is accessible in a preferred manner from above. In this case, from above means that at least a part of the opening in the shaft element or shaft part and at least a part of the opening in the element for mounting run parallel to the bottom plate or bottom surface.

If the shaft element or shaft part and the element for mounting are hollow-cylindrical, then accessibility from above means that a center line of the circular arc which runs radially outward through a center point of the circular arc intersects the bottom plate or bottom surface at a predetermined angle. In this case, the predetermined angle may be in an angle interval from for example 30 to 150 degrees. The angle is preferably 90 degrees or close to 90, for example between 80 and 100 degrees. In this case, the center line of the circular arc intersects a base surface of the shaft holder at an angle of 45 degrees. In this case, the predetermined angle does not relate to areas of hold-down devices.

In a further embodiment, the holder comprises at least one guide element, with the guide element having at least one guide rib in the form of part of a circle. The guide element can in this case be attached to the shaft holder. For this purpose, the guide element has an attachment element, and the shaft holder has a corresponding attachment element. The guide element can preferably be attached to the shaft holder at the side. This allows optical waveguides and/or multifiber units to be guided by the shaft holder at the side. The guide ribs which are in the form of parts of circles in this case have a radius of at least the minimum bending radius of an optical waveguide. In this case, they are arranged such that optical waveguides and/or multifiber units which are guided by the shaft holder at the side can be guided in a running direction parallel to the pivoting axis, while complying with the minimum bending radius. The guide elements therefore allow optical waveguides and/or multifiber units to be guided by the shaft holder at the side, in which case individual optical waveguides and/or multifiber units can then be guided by means of the guide ribs, which are in the form of parts of circles, toward an inlet/outlet opening of the guidance channel.

BRIEF DESCRIPTION OF THE DRAWINGS

The invention will be explained in more detail in the following text with reference to one exemplary embodiment. In the figures.

DETAILED DESCRIPTION

In the following text, the same reference symbols refer to elements having the same or similar technical characteristics.

Figure 1:
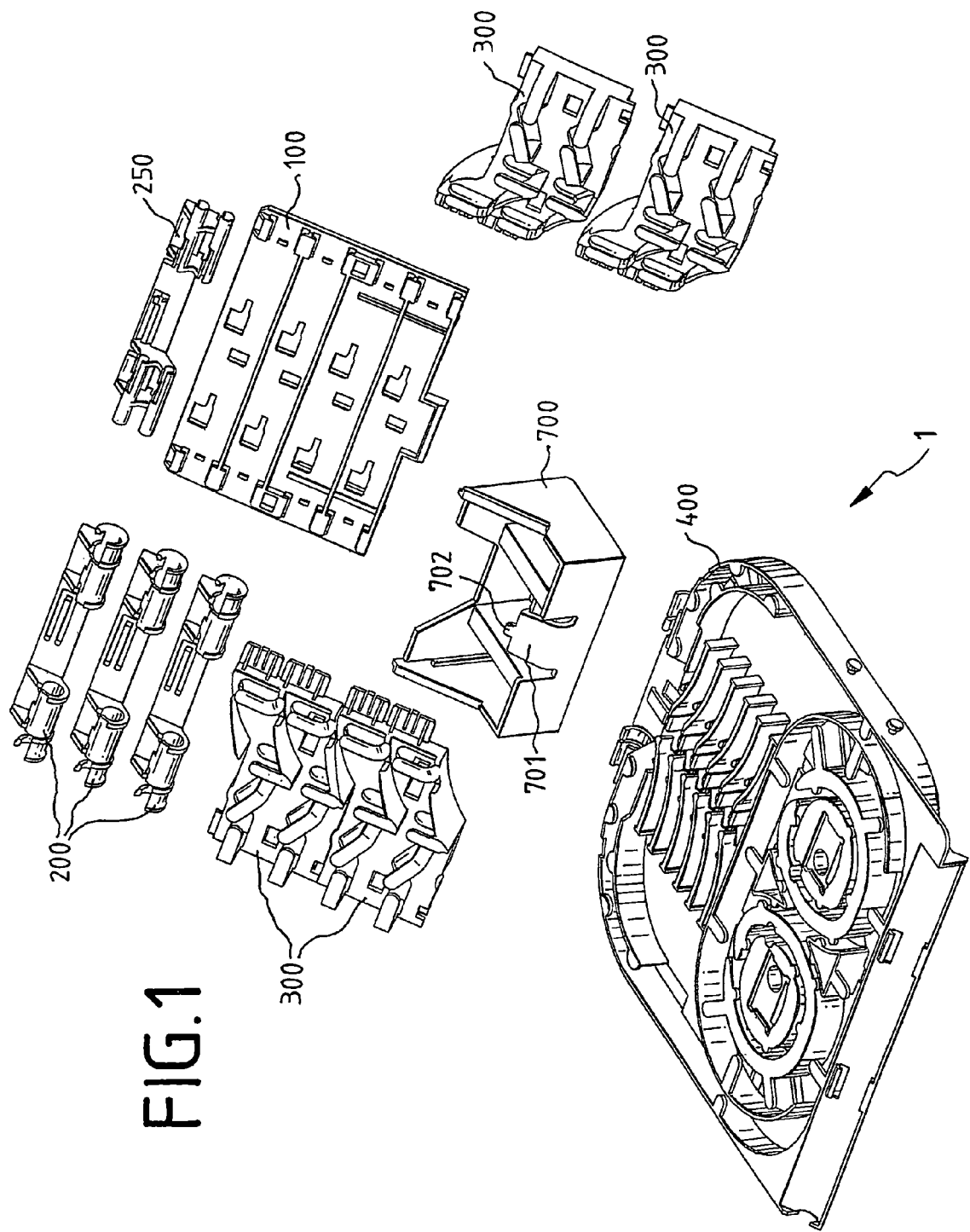
FIG. 1 shows an exploded drawing of a holder.

FIG. 1 shows an exploded drawing of a holder 1. The holder 1 has a shaft holder 100, three shaft elements 200 and a further shaft element 250. The holder 1 furthermore has elements 300 for cable guidance, and a splice cassette 400.

A coupling element 700 is also illustrated.

The individual components of the holder 1 will be described in detail in the following text.

Figure 2:
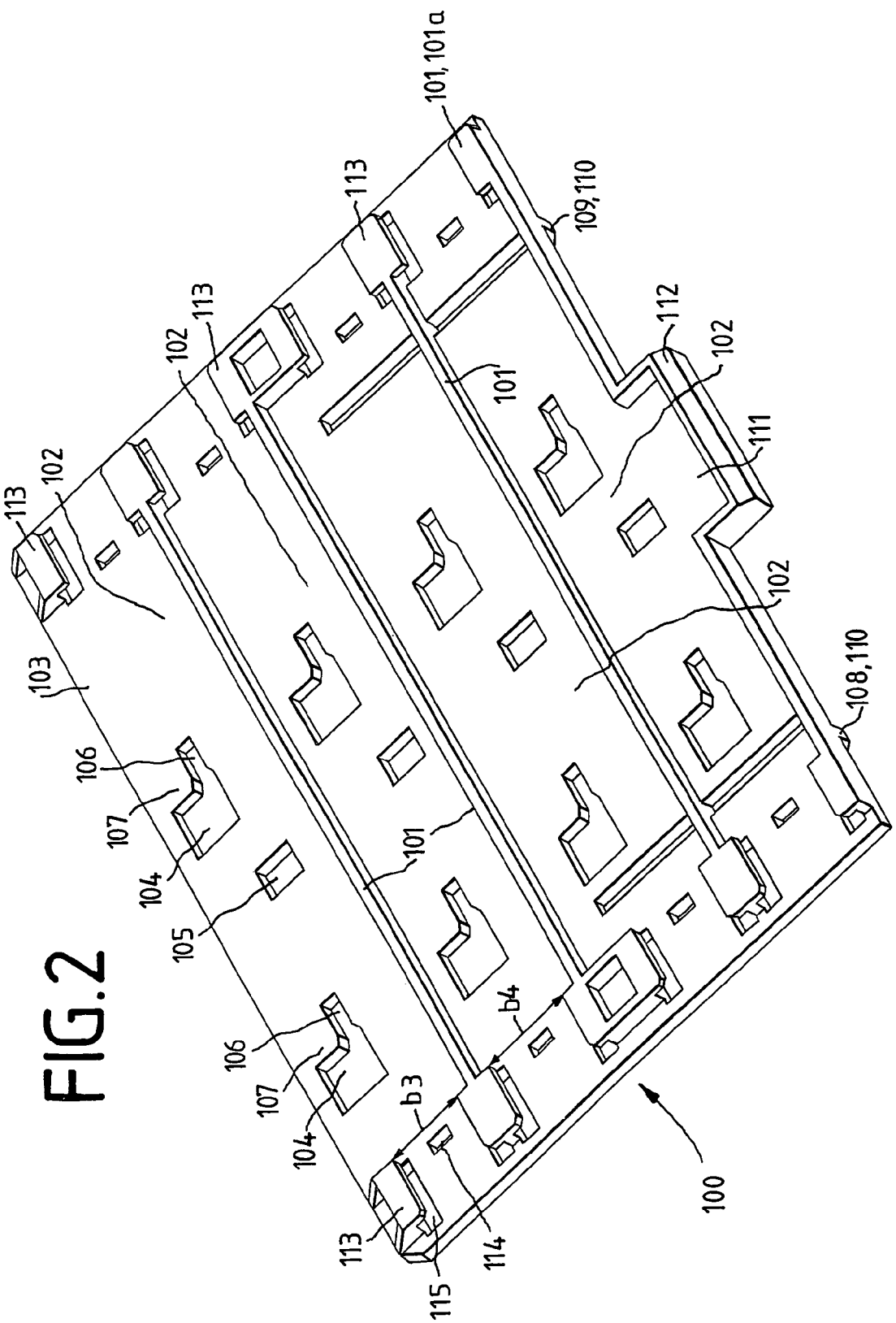
FIG. 2 shows a perspective view of a shaft holder.

FIG. 2 shows a perspective illustration of the shaft holder 100, which in this case is in the form of a rectangular plate. The shaft holder 100 is subdivided by separating ribs 101 into horizontal holding sections 102. The separating ribs 101 in this case project at right angles from a surface 103 of the shaft holder 100. A lower separating rib 101 is in this case also referred to as a stop rib 101a.

In this case, each holding section 102 has two latching openings 104 and a further opening 105. In this case, the latching openings 104 each have a latching slot 106, which runs parallel the separating ribs 101 in the direction of one side of the shaft holder, and opens into the latching opening 104. A latching element 202 of a shaft element 200, 250, which is illustrated by way of example in FIG. 3 and FIG. 4, can in this case be inserted into the latching opening 104. The latching element 202 is in this case in the form of a web which has an L-shaped cross section and is raised above a rear face of the shaft element 200, 250. The L-shaped latching element 202 in this case has a first limb 203 and a second limb 204. The first limb 203 and the second limb 204 in this case surround a volume which is referred to in the following text as the undercut 205.

In order to latch the latching element 202 to the shaft holder 100, the latching element 202 is inserted into a latching opening 104. The first limb 203 of the shaft part 200, 250 is then pushed into the latching slot 106. During this process, a part 107 of the shaft holder 100 which is arranged over the latching slot 106 relative to the shaft holder 100 slides into the undercut 205, while the second limb 204 engages behind the part 107 of the shaft holder. During this process, the first limb 203 of the shaft part 200, 250 is preferably clamped in the latching slot 106. The shaft part 200, 250 is therefore latched to the shaft holder 100. The shaft part 200, 250 can be released by pushing the first limb 203 out of the latching slot 106, in which case a clamping force of the latching slot 106 onto the first limb 203 must be overcome. The shaft part 200, 250 can then be removed from the latching opening 104 with the latching element 202.

At a lower end of the shaft holder 100, the latter has a first attachment rib 108 and a second attachment rib 109 on the rear face. The attachment ribs 108, 109 likewise have a profile with an L-shaped cross section and are raised above a rear face of the shaft holder 100. In this case, the L-shaped attachment ribs 108, 109 have a first limb 110 and in each case one second limb, which is not illustrated. In this case, the second limb of the first attachment rib 108 and the second limb of the second attachment rib 109 face one another, in such a way that undercuts, which are likewise not illustrated, surrounded by the first limbs 110 and second limbs, are open toward one another. The attachment ribs 108, 109 are used for attachment of the shaft holder 100 to a coupling element 700 which, for example, is illustrated in FIG. 1. In this case, the coupling element 700 has attachment ribs which correspond to the attachment ribs 108, 109 and likewise have a profile with an L-shaped cross section. The shaft holder 100 can be plugged onto the coupling element 700, with a second limb of an L-shaped first attachment rib of the coupling element 700 sliding into the undercut which is surrounded by the first limb 110 and the second limb of the first attachment rib 108. A second limb of an L-shaped second attachment rib of the coupling element 700 analogously slides into the undercut which is surrounded by the first limb 110 and the second limb of the second attachment rib 109.

Furthermore, at a lower end, the shaft holder 100 has a latching projection 111. In the area of the latching projection 111, the stop rib 101a has a chamfered part 112 of the stop rib 101a. The shaft holder 100 can be latched to the coupling element 700 by means of the latching projection 111. In this case, the coupling element 700 has a latching tongue 701 which interacts with the latching projection. The latching tongue 701 has a latching tab 702 at an upper end. In this case, the latching tab 702 becomes thicker from its upper end to a nose edge, which is not illustrated. The thickening part may in this case be referred to as a nose leg. When the shaft holder 100 is plugged on, the chamfered part 112 of the stop rib 101a slides over the nose leg, thus resulting in the latching tongue being pushed out of an initial position by the latching projection 111 against a spring force of the latching tongue 701.

Once the shaft holder 100 has been plugged on completely, then the chamfered part no longer pushes the latching tongue 701 away from the latching projection 111. The spring force of the latching tongue 701 causes it to return to its initial position. In the process, the nose edge slides over the stop rib 101a, as a result of which the shaft holder 100 is latched to the coupling element 700.

The type of latching described above, by means of a latching tongue, latching tab and latching projection, is referred to in the following text as latching-tongue-based latching.

Figure 11:
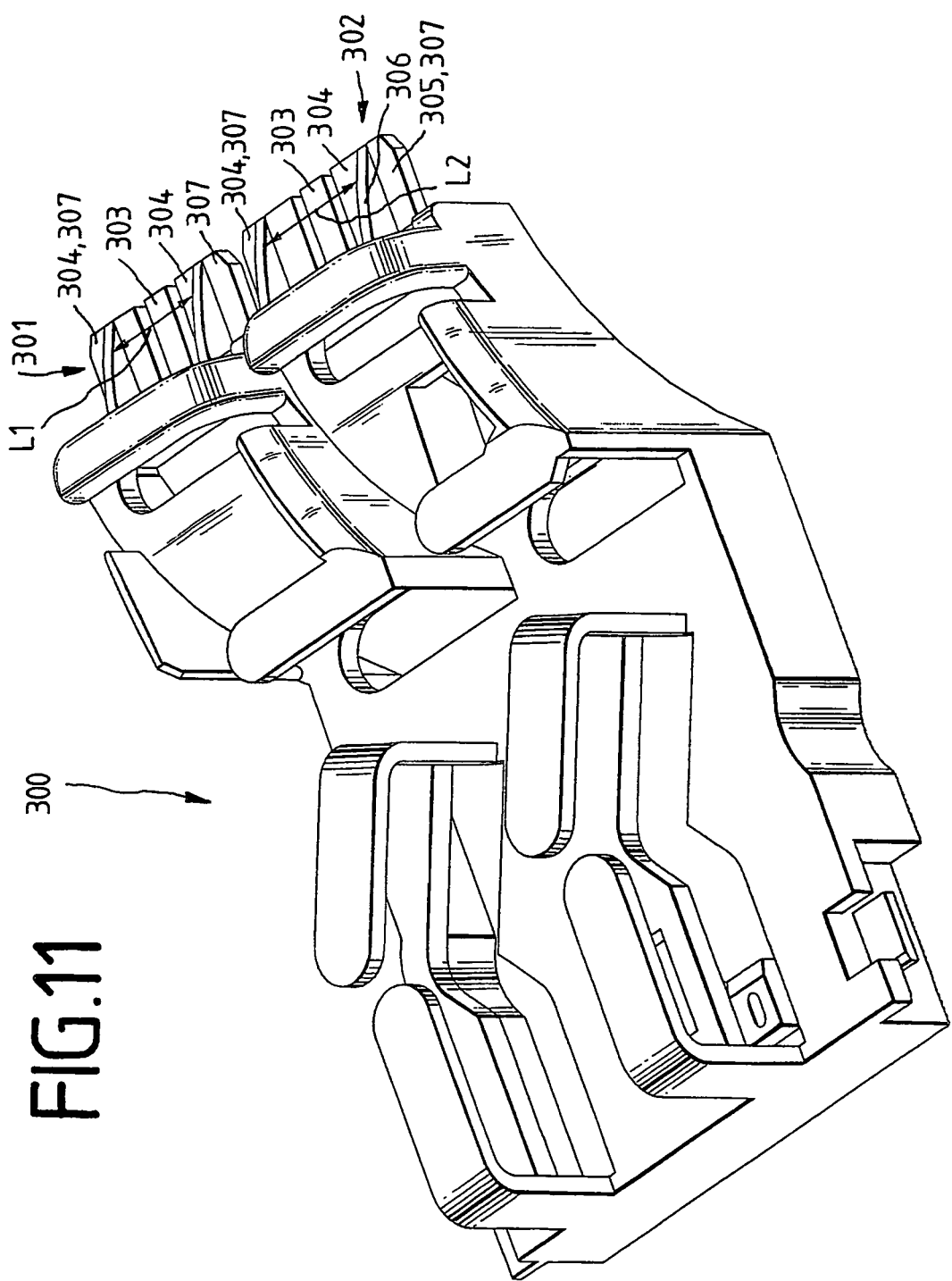
FIG. 11 shows a perspective view of a guide element.

Furthermore, the separating ribs 101 have hold-down devices 113 at each of their ends. In this case, the hold-down devices 113 project over the surface 103 of the shaft holder 100, and enclose an undercut with it. The hold-down devices 113 are in this case used for plugging on elements 300 for cable guidance which, for example, are illustrated in FIG. 11. An element 300 for cable guidance in this case has a first plug-on element 301 and a second plug-on element 302. A plug-on element 301, 302 in this case has a latching tongue 303 and two plug-on tongues 304. In this case, the latching tongue 303 is arranged to be freestanding between the plug-on tongues 304.

In this case, a plug-on tongue 304 has a profile with a T-shaped cross section, comprising a first limb 305 and a second limb 306 arranged at right angles thereto. When being plugged on, those parts 307 of the first limbs 305 which are on the outside relative to the plug-on element 301, 302 slide into the undercuts which are enclosed by the hold-down devices 113 and the surface 103 of the shaft holder 100. During the process, the second limbs 306 of the plug-on tongues 304 are guided past side surfaces 115 of the hold-down devices 113.

The latching-tongue-based latching of the shaft holder 100 and element 300 for cable guidance during the plugging-on process, as described above, can be carried out by means of the latching tongue 303 and a latching opening 114, which is used as a latching projection, in the shaft holder 100. During this process, a latching tab which is arranged on the lower face of the latching tongue 303 can engage in the latching opening 114.

In this case, it should be noted that the distance b1 between the second limb 306 of the plug-on tongues 304 on the first plug-on element 301 is not the same as the distance b2 between the second limb 306 of the plug-on tongues 304 on the second plug-on element 301. In a corresponding manner, the distance b3 between opposite side surfaces 115 of hold-down devices 113 of a holding section 102 is not equal to the distance b4 between side surfaces 115 of hold-down devices 113 of a vertically adjacent holding section 102. This advantageously ensures that an element 300 for cable guidance can be plugged onto the shaft holder 100 only at specific positions. In particular, hold-down devices 113 of adjacent separating ribs 101 can be designed such that they produce the distances b3, b4 between opposite side surfaces 115 of hold-down devices 113 of a holding section 102.

Figure 3:
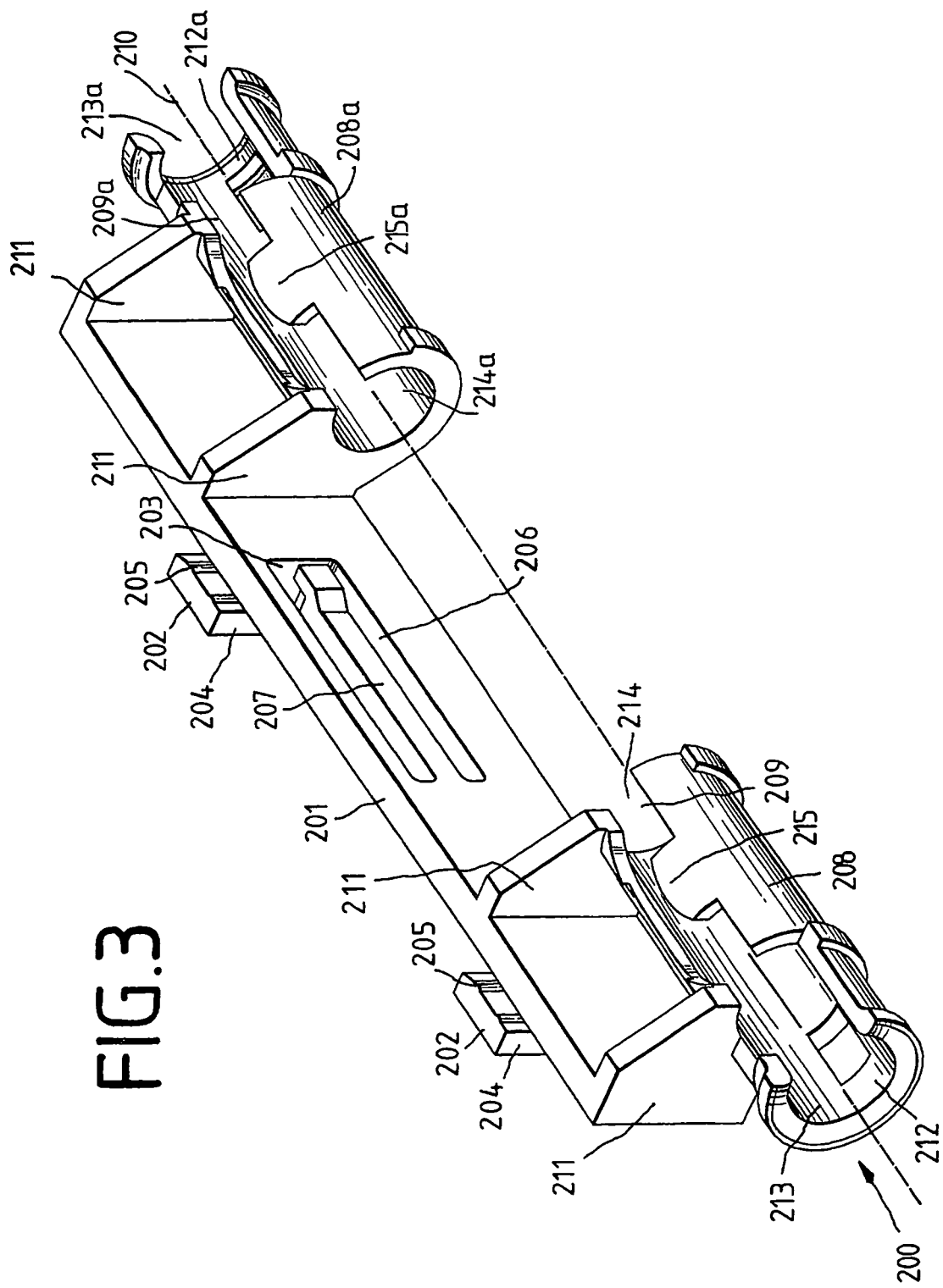
FIG. 3 shows a perspective view of a shaft element.

FIG. 3 shows a first shaft element 200. The shaft element 200 has a baseplate 201 of the shaft holder 200. Two latching elements 202, which have been described above, are arranged on a rear face of the baseplate 201. In this case, the L-shaped latching elements 202 have a first limb 203 and a second limb 204. The first limb 203 and the second limb 204 surround an undercut 205.

Furthermore, a free-standing latching tongue 207 is arranged in an opening 206 in the baseplate 201. In this case, latching-tongue-based latching of a shaft element 200 and of the shaft holder 100 can be carried out by means of the latching tongue 207. In this case, the latching openings 104 are also used as latching openings for the latching-tongue-based latching. In this case, a nose edge slides over an edge of the latching opening 104 when the first limb 203 of the shaft part 200 is pushed into a latching slot 106. It is also possible for the openings 105 in the shaft holder 100 (see FIG. 1) to be used as latching openings for the latching-tongue-based latching.

Furthermore, the shaft element 200 has a first shaft part 208 and a second shaft part 208a. The shaft parts 208, 208a are hollow-cylindrical. The figure also shows a central longitudinal axis 201, which is common to the first and second shaft parts 208, 208a and at the same time is a center axis of the hollow cylinder. As will be explained in more detail later, the central longitudinal axis 210 at the same time forms a pivoting axis for a term cassette 500 (see FIG. 5) or a splice cassette 400 (see FIG. 6), or a term-splice cassette 600 (see FIG. 7), in which case the cassettes 400, 500, 600 can pivot about the pivoting axis.

The shaft parts 208, 208b are in this case arranged separated from the baseplate 201 by holding webs 211. Since the shaft parts 208, 208a are hollow-cylindrical, the shaft parts 208, 208a have a respective guidance channel 212, 212a. These guidance channels 212, 212a run along the entire longitudinal extent of the shaft parts 208, 208a, and along the central longitudinal axis 210. The guidance channels 212, 212a therefore run parallel to the pivoting axis.

The first shaft part 208 in this case has an opening 213 in the outer end face, and an opening 214 in the inner end face, by means of which the guidance channel 212 is accessible through the openings 213, 214. In this case, the second shaft part 208a analogously has an opening 213a in the outer end face, and an opening 214a in the inner end face, by which means the guidance channel 212a is accessible through the openings 213a, 214a. By way of example, optical waveguides or multifiber units can be inserted into the guidance channels 212, 212a, and removed from them, through these openings 213, 214, 213a, 214a.

An envelope surface of the shaft parts 208, 208a has a slot 209, 209a which extends in the direction of the overall longitudinal extent along the shaft parts 208, 208a. In this case, the slot runs parallel to the central longitudinal axis 210 and connects the opening 213 and the opening 214 in the first shaft part 208, and the opening 213a and the opening 214 in the second shaft part 208a. The guidance channel 210, 210a is accessible from outside the shaft part 208, 208a through the slot 209, 209a. In particular, for example, optical waveguides or multifiber units can be inserted into the guidance channel 210, 210a, or removed from it, through the slot 209, 209a.

If one considers a cross section through the shaft part 208 at right angles to the longitudinal axis 210, then a circumferential profile has an opening in the form of a circular arc and with a specific center-point angle (opening angle) which, for example, is 90 degrees.

Along the longitudinal extent, the shaft part 208, 208a has hold-down devices 215, 215a. If one considers a cross section through the shaft part 208 at right angles to the longitudinal axis 210 in the area of a hold-down device 215, 215a, then a circumferential profile has an opening in the form of a circular arc and with an opening angle which is less than 45 degrees. The hold-down devices 215, 215a create a constriction in the slot 209, 209a thus making it more difficult for optical waveguides or multifiber units which have been inserted into the guidance channel 210, 210a to slide out.

A center line of the opening, which is in the form of a circular arc, outside areas of hold-down devices 215, 215a, which runs through a center point of the circular arc radially outward, intersects the base surface 201 at an angle of 45.

Figure 4:
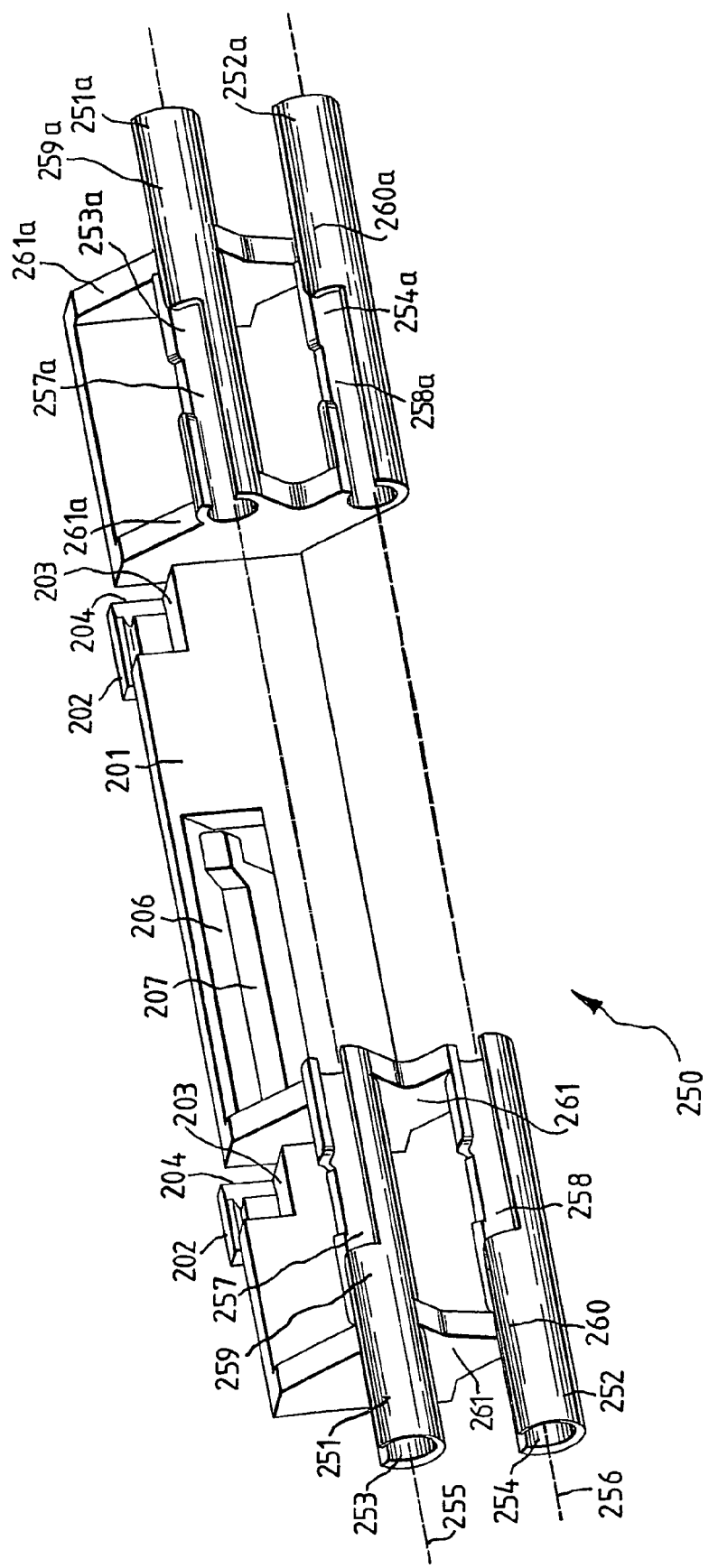
FIG. 4 shows a perspective view of a further shaft element.

FIG. 4 shows a second shaft element 250. In this case, identical elements of the first shaft element 200 as illustrated in FIG. 3 and of the second shaft element 250 are annotated with the same reference symbols. In contrast to the first shaft element 200, the second shaft element 250 has a first shaft part pair with two shaft parts 251, 251a, and a second shaft part pair with two shaft parts 252, 252a. As in the case of the first shaft element 200, all the shaft parts 251, 251a, 252, 252a are hollow-cylindrical and have a respective guidance channel 253, 253a, 254, 254a. In this case, the diameter of the guidance channels 253, 253a, 254, 254a is less than the diameter of the guidance channels 209, 209a of the first shaft element 200.

The shaft parts 251, 251a of the first shaft part pair have a common central longitudinal axis 255. Analogously, the shaft parts 252, 252a have a common central longitudinal axis 256. The central longitudinal axes 255, 256 are in this case parallel to one another. Analogously to the shaft parts 208, 208a of the first shaft element 200, envelope surfaces of the shaft parts 251, 251a, 252, 252a have slots 257, 257a, 258, 258a along their entire longitudinal extent, with hold-down devices 259, 259a, 260, 260a being formed in subareas of the slots.

The shaft parts 251, 251a, 252, 252a are in this case arranged separated from the baseplate 201 by holding webs 261, 261a. In this case, the shaft part 251 of the first shaft part pair, and the shaft part 252 of the second shaft part pair are arranged separated from the baseplate 201 via common holding webs 261. Analogously, the shaft part 251a of the first shaft part pair, and the shaft part 252a of the second shaft part pair, are arranged separated from the baseplate 201 via common holding webs 261a.

On the second shaft element 250, two cassettes can in this case be attached to the shaft element 250, such that they can pivot, by means of the two shaft part pairs. A first cassette may be attached to the shaft element 250 such that it can pivot, for example by means of the shaft parts 251, 251a, and a second cassette can be attached in this way by means of the shaft parts 252, 252a.

Figure 5:
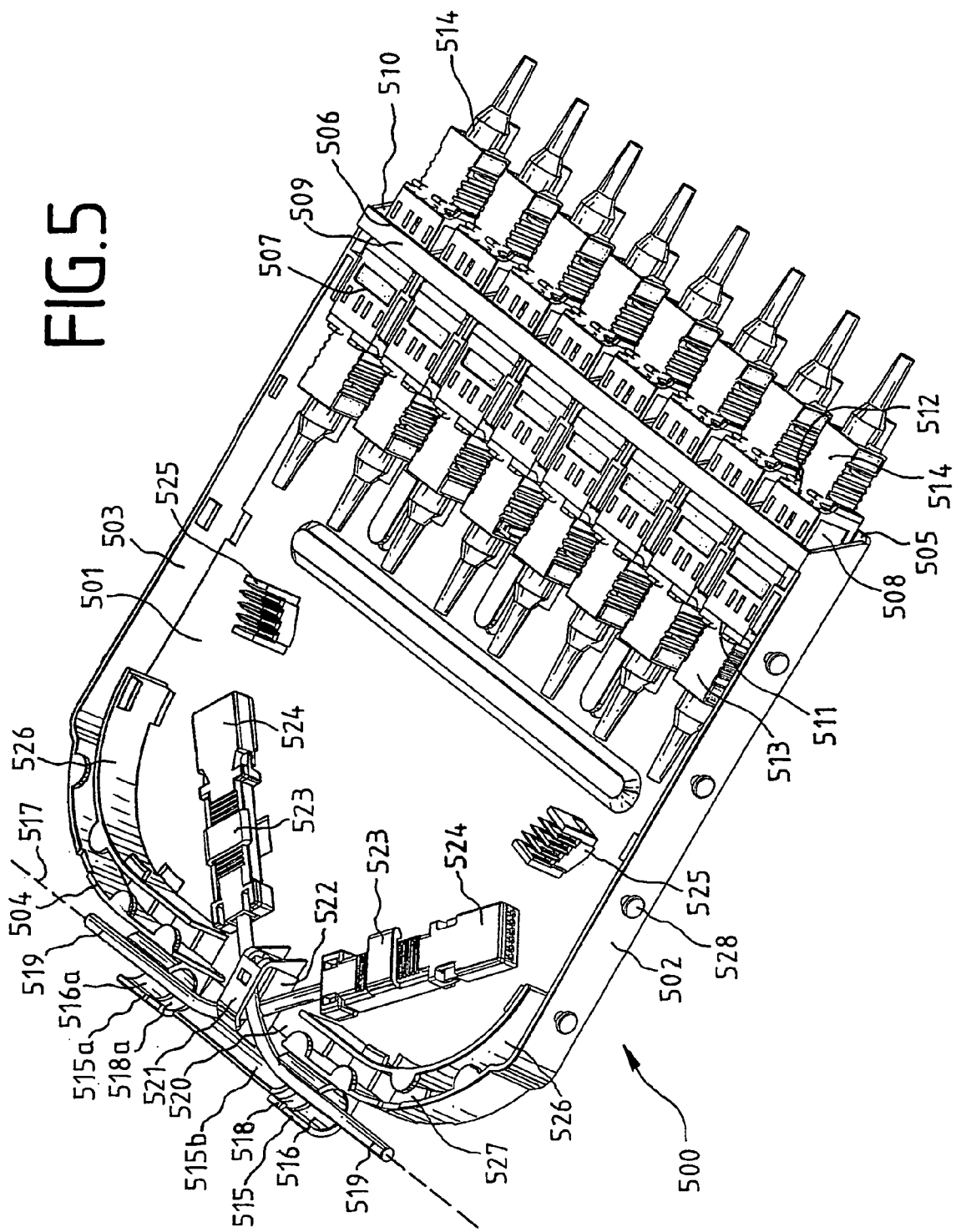
FIG. 5 shows a perspective view of a term cassette.

FIG. 5 shows a perspective view of a term cassette 500. The term cassette 500 has a bottom surface 501, a left-hand side wall 502, a right-hand side wall 503 and an upper end wall 504. The figure in this case shows that a transition between the left-hand and right-hand side walls 502, 503 and the upper end wall 504 has a rounded profile. The term cassette 500 is open on a lower end face 505, and forms a holder 506 for adapters 507.

The holder 506 for adapters 507 in this case has a plurality of plug-in slots 508. Plug-in slots are in this case formed by the bottom surface 501, a holding web 509 running along the lower end face, and by separating ribs 510 and/or the left-hand or right-hand side wall 502, 503. In this case, the bottom surface 501 has rectangular depressions, which are not illustrated. In this case, adapters 507 can be plugged into the plug-in slots 508 and can thus be attached to the term cassette 500. In the illustration in FIG. 5, adapters 507 have been plugged into all eight plug-in slots 508.

In this case, the adapters 507 have an input side 511 and an output side 512. The input side 511 in this case has a plug contact, which is not illustrated, for a glass-fiber plug 513, and the output side has a plug contact, which is likewise not illustrated, for a further glass-fiber plug 514. As can be seen from FIG. 5, the glass-fiber plug 513 and the further glass-fiber plug 514 are the same, although, of course, the plug contacts may also be designed for different types of glass-fiber plugs. In this case, the output side 512 is accessible from outside the term cassette 500, and the inside 511 is accessible from inside the term cassette 500. In the illustration in FIG. 5, glass-fiber plugs 513 have been plugged into all the plug contacts of the adapters 507 on the input side, and glass-fiber plugs 514 have been plugged in in the same way on the output side.

Furthermore, FIG. 5 shows a first element 515 and a second element 515a for rotatable mounting of the term cassette 500. The elements 515, 515a for rotatable mounting are arranged on an outer face of the upper end wall 504.

The elements 515, 515a are in this case hollow-cylindrical and have a respective shaft channel 516, 516a. The figure also shows a central longitudinal axis 517, which is common to the first and second elements 515, 515a and, at the same time, is a center axis of the hollow cylinders. The internal diameter of the elements 515, 515a is greater by a predetermined amount than the external diameter of the shaft parts 208, 208a of the first shaft part (see FIG. 3). A hollow cylinder on the shaft element side can thus be inserted or plugged into the cavity in a hollow cylinder on the cassette side.

These shaft channels 516, 516a run along a common longitudinal extent of the elements 515, 515a, and along the central longitudinal axis 517.

An envelope surface of the elements 515, 515a has a slot 518, 518a which extends in the direction of the entire longitudinal extent along the elements 515, 515a. The slot 518, 518a in this case runs parallel to the central longitudinal axis 517.

If one considers a cross section through the element 515, 515a at right angles to the longitudinal axis 517, then a circumferential profile of the element 515, 515a has an opening in the form of a circular arc with a specific center-point angle (opening angle) which, for example, is 150 degrees. A center line of the opening which is in the form of a circular arc and runs radially outward through a center point of the circular arc is in this case at right angles to the bottom surface 501.

The term cassette 500 can be attached to the shaft element 200 such that it can pivot, by means of the elements 515, 515a for rotatable mounting and the shaft parts 208, 208a. When being attached, the term cassette 500 is positioned such that the first shaft part 208 is inserted via the slot 518 into the first shaft channel 516, and the second shaft part 208a is inserted via the slot 518a into the second shaft channel 516a. Therefore, in the inserted state, the first element 515 for rotatable mounting brackets the first shaft part 208, and the second element 515a for rotatable mounting brackets the second shaft part 208a. The bracketing is provided by the opening angle of the opening, which is in the form of a circular arc, in the circumferential profile of the elements 515, 515a for rotatable mounting, which must be less than 180 degrees for this purpose.

In the inserted state, the central longitudinal axis 210 of the shaft parts 208, 208a lies on the central longitudinal axis 517 of the elements 515, 515a. The term cassette 500 can in this case pivot about the shaft parts 208, 208a, about the pivoting axis formed by the central longitudinal axis 210. When the term cassette 500 is pivoted about the shaft parts 208, 208a, then an inner surface of the elements 515, 515a for rotatable mounting slides over an outer surface of the shaft parts 208, 208a. The hollow cylinder on the cassette side therefore rotates about the hollow cylinder on the shaft element side, during which process the hollow cylinder on the shaft element side does not carry out any rotary movement, that is to say it remains stationary (stationary shaft).

Furthermore a holding tongue 515b is arranged between the elements 515, 515a. This likewise has a profile which is curved upward, in order not to impede a pivoting movement of the term cassette 500.

FIG. 5 furthermore shows an example of a profile of a cable 519 (for example a multifiber unit). In this case, part of the cable 519 runs in the shaft channels 516, 516a. In this case, it should be noted that term cassette 500 in FIG. 5 has not been attached to a shaft element 200. If the term cassette 500 were attached to a shaft element 200, the cable 519 running in the shaft channels 516, 516a in FIG. 5 would run in the guidance channels 209, 209a of the shaft channels 208, 208a.

The upper end wall 504 of the term cassette 500 has an inlet/outlet section 520. A hold-down device 521 is arranged on the bottom surface 501 centrally in the inlet/outlet section 520. Together with the bottom surface 501, the hold-down device 521 forms an undercut 522. In this case, the cable 519 is inserted via the shaft channels 516, 516a into the term cassette 500 and the inlet/outlet section 520 into an internal area in the term cassette 500. In this case, the cable is also passed through the undercut 522.

As illustrated in FIG. 5, the term cassette 500 also has elements 523 for detachable attachment of fan-out elements 524, by means of which the optical waveguides in the cable 519 can be separated, and their glass-fiber plugs 513 can be plugged into the adapters 507.

Furthermore, the term cassette has elements for guidance of optical waveguides and/or cores. By way of example, two elements 525 for guidance of optical waveguides are illustrated. The element 525 has a plurality of guide ribs which project at right angles from the bottom surface 501 and are separated from one another, and between which optical waveguides which are not illustrated are passed.

Furthermore, guide ribs 526 for guidance of multifiber units or optical waveguides are illustrated. These run parallel to a curved part of the upper end wall 504, and project at right angles from the bottom surface 501. A partially curved guidance channel is therefore formed between an inner face of the upper end wall 504 and the guide rib 526. The radius of curvature in this case corresponds at least to the minimum bending radius of the optical waveguides or cores. In the area of the guidance channel, the bottom surface 501 has at least one opening 527. Optical waveguides or cores can be inserted into the term cassette 500, or removed from it, through the opening 527. Furthermore, latching tabs 528, which are arranged on an outer face of the right-hand and left-hand side walls 502, 503, are also illustrated, by means of which additional elements can be attached to the term cassette 500.

Figure 6:
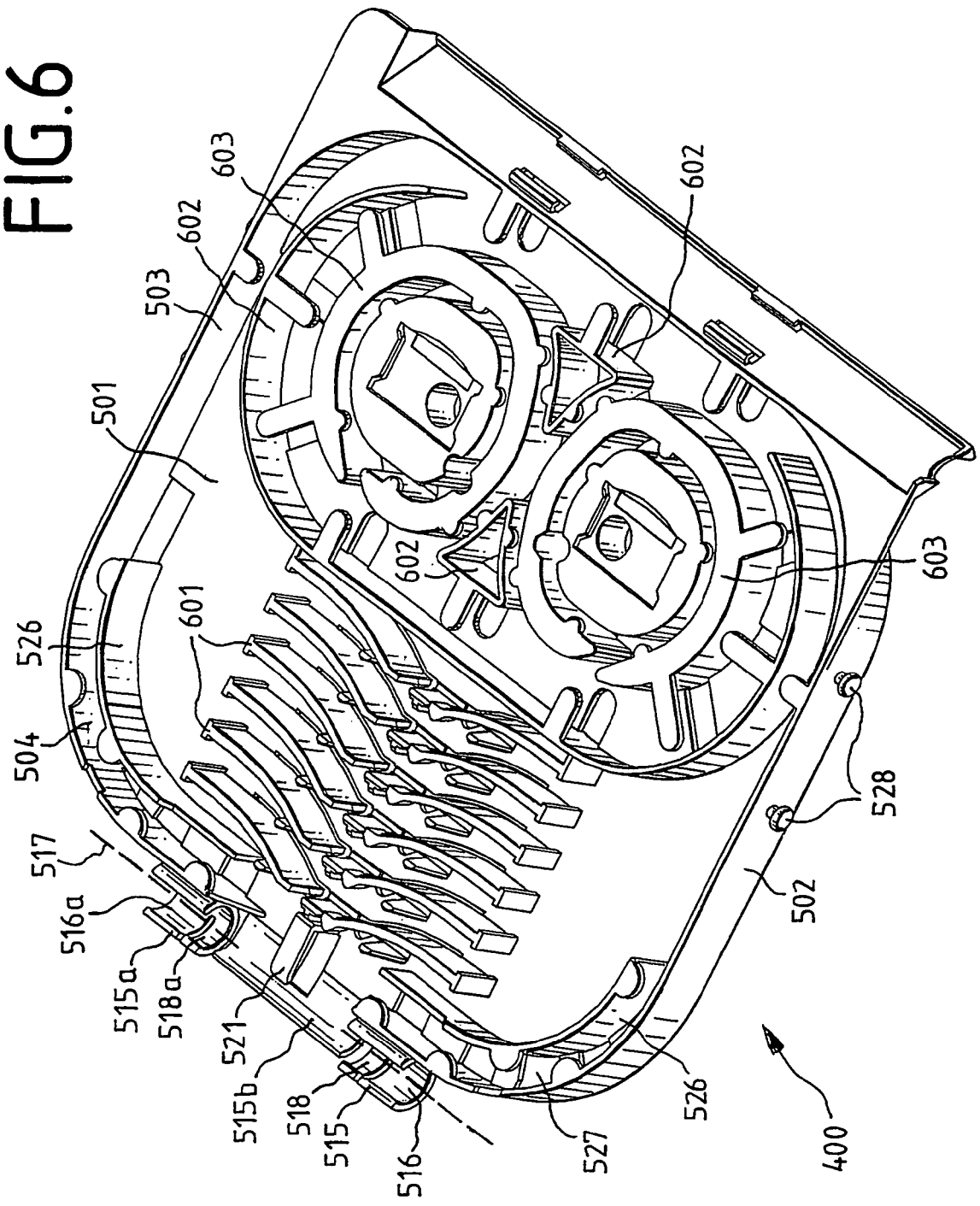
FIG. 6 shows a perspective view of a splice cassette.

FIG. 6 shows a perspective view of a splice cassette 400. In this case, the splice cassette 400 is designed in a similar manner to the term cassette 500 (see FIG. 5). The same reference symbols are therefore used for the same elements. In this case, the splice cassette 400 has a total of six splice holders 601, in which case two splice connections, which are not illustrated, can in each case be clamped, that is to say attached, by means of a splice holder 601.

Furthermore, the splice cassette 400 has elements for guidance and deposition of optical waveguides. The elements for guidance and deposition in this case have guide ribs 602 and guide bodies 603. The guide bodies are in this case raised above a bottom surface 501 of the splice cassette 600. A profile of the guide ribs 602 and a contour of the guide bodies 603 define a plurality of at least partially circular or oval profiles, whose respective radii correspond at least to the minimum bending radius of the optical waveguides. The guide bodies 603 and the guide ribs 602 are arranged with respect to one another such that a plurality of circular guides merge tangentially into one another on defined areas.

The splice cassette can be attached to a shaft element 200 (see FIG. 3) in the same way as the term cassette 500 by means of the elements 515, 515*a* for rotatable mounting.

Figure 7:
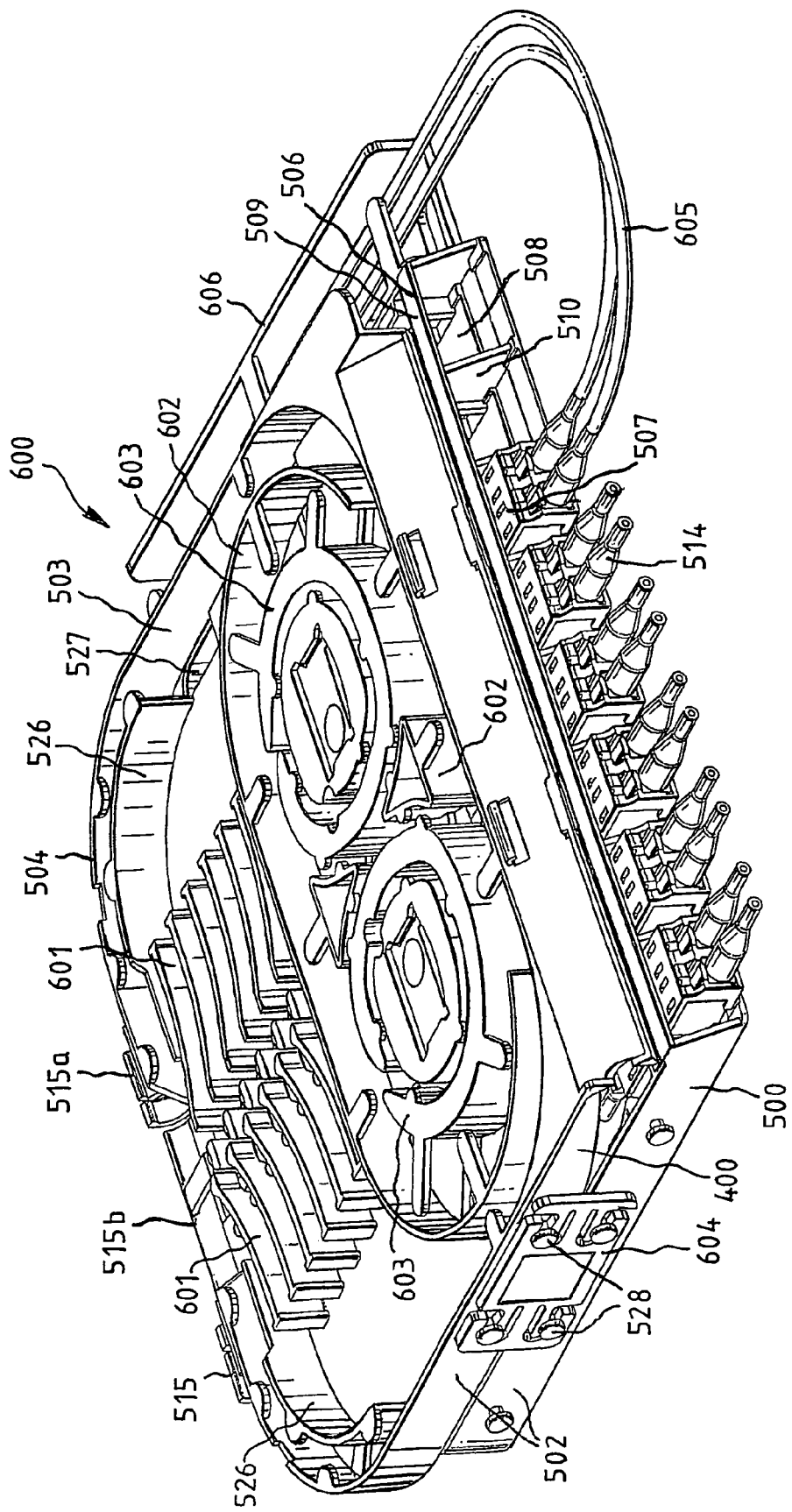
FIG. 7 shows a perspective view of a term-splice cassette.
Figure 8:
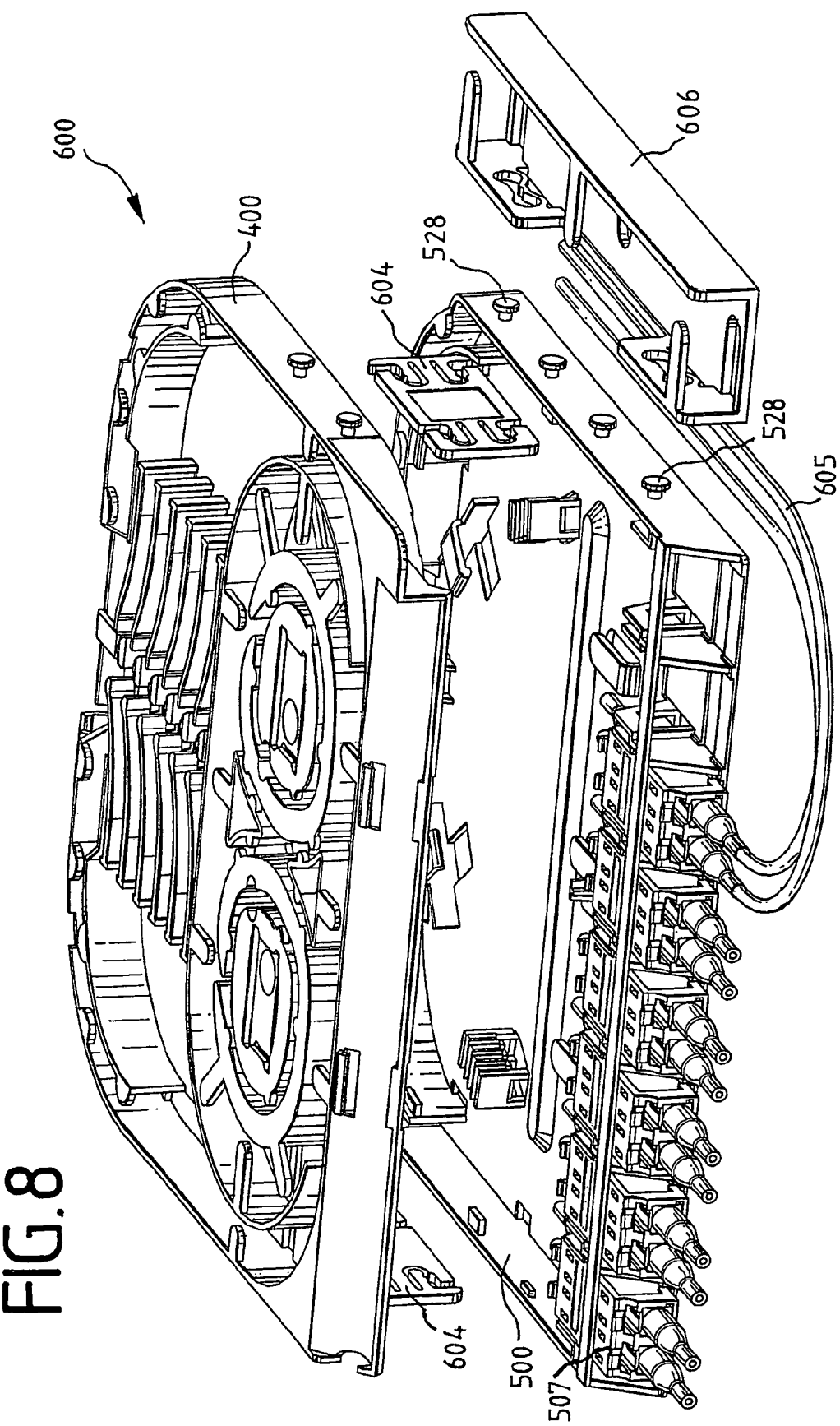
FIG. 8 shows an exploded drawing of the term-splice cassette illustrated in FIG. 7.

FIG. 7 shows a perspective side view of a term-splice cassette 600. The term-splice cassette 600 in this case has the term cassette 500 as illustrated in FIG. 5 and the splice cassette 400 as illustrated in FIG. 6. In this case, the term cassette 500 and splice cassette 400 are connected to one another via a latching plate 604. In this case, the latching plate 604 has four slots, into which the latching tabs 528 can be pushed. This makes it possible to produce a compact term-splice cassette 600 which can be prefabricated. For example, this allows twelve incoming optical waveguides to be spliced to twelve pigtails in the splice cassette 400, in which case the pigtails can be passed into the term cassette 500, where they can be inserted into the rear face of the adapters 507. In the illustrated example, the term-splice cassette 600 is fitted with only six adapters 507, for two plugs each, with the two right-hand holders not being fitted. The patch cord cables 605 therefore assume the minimum bending radius when they are passed to the rear through the cable guidance element 606. The cable guidance element 606 is in this case attached to the latching tabs 528. If, in contrast, cable guidance element 606 is attached to the left-hand side of the term-splice cassette 600, then the two left-hand holders for the adapters 507 remain unused. FIG. 8 shows an exploded illustration of the term-splice cassette 600.

Figure 9:
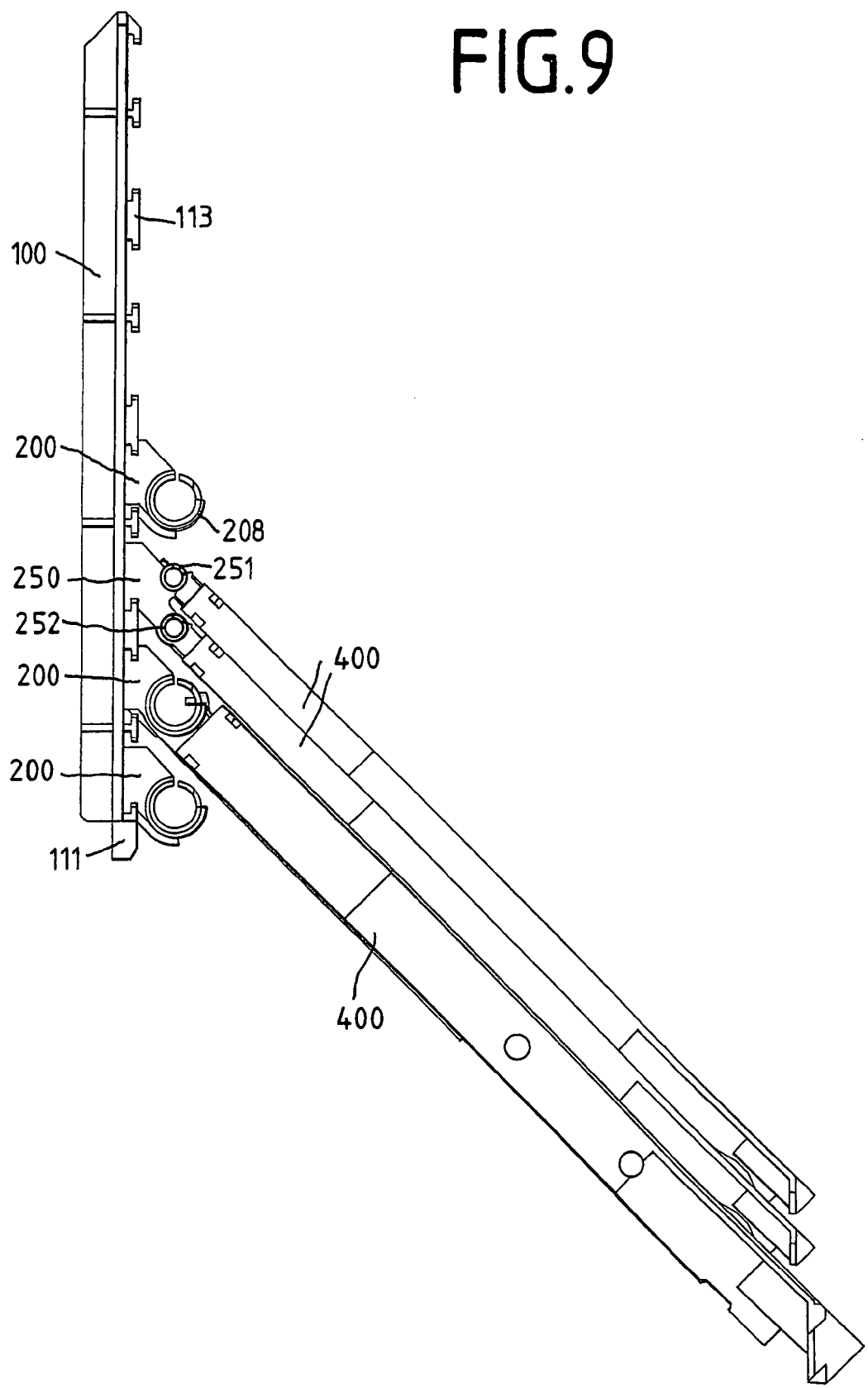
FIG. 9 shows a side view of a holder.
Figure 10:
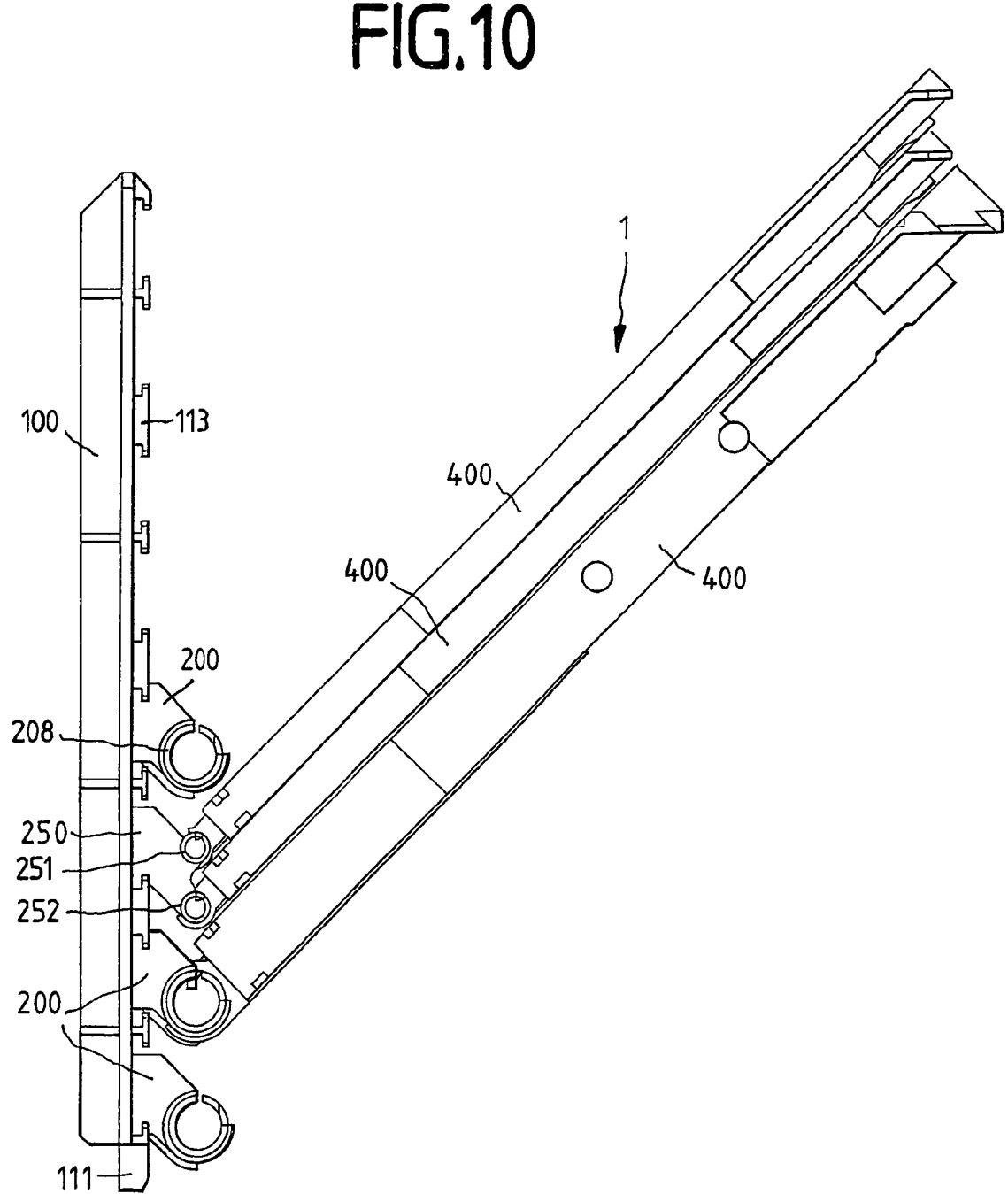
FIG. 10 shows a further side view of a holder.

FIG. 9 shows a side view of the holder 1. In this case, three shaft elements 200 and one shaft element 250 are arranged on the shaft holder 100, with the uppermost and the bottommost shaft elements not being fitted with cassettes. A large splice cassette 400 is hinged on the second shaft element 200 from the bottom while, in contrast, two small splice cassettes 400 are hinged on the shaft element 250. The two small splice cassettes 400 in this case together have approximately the same physical height as the one large splice cassette 400. The splice cassettes 400 are in this case shown in a normal position, with the splice cassettes 400 being positioned at an angle of about 45 degrees with respect to the shaft holder 100. If the shaft holder 100 is now positioned at an angle of 45 degrees with respect to a bottom plate, then the splice cassettes lie parallel to the bottom plate. In this normal position, the guidance channels in the shaft elements 200, 250 are open, in such a way that optical waveguides can be inserted into and removed from the uppermost shaft element from above relatively easily. In FIG. 10, the splice cassettes 400 have been pivoted upward through about 90 degrees in order, for example, to access a lower splice cassette, which is not illustrated. During this pivoting movement about the shaft elements 200, 250, the guidance channel is then closed, preventing the optical waveguides in the shaft elements 200, 250 from sliding out accidentally.

LIST OF REFERENCE SYMBOLS

1 Holder
100 Shaft holder
101 Separating ribs
101*a* Stop rib
102 Holding section
103 Surface
104 Latching opening
106 Latching slot
107 Part
108, 109 Attachment ribs
110 First limb
111 Latching projection
112 Chamfered part
113 Hold-down device
115 Side surfaces
200 Shaft elements
201 Baseplate
202 Latching element
203 First limb
204 Second limb
205 Undercut
206 Opening
207 Latching tongue
208 First shaft part
208*a* Second shaft part
209, 209*a* Slot
210 Longitudinal axis
211 Holding webs
212, 212*a* Guidance channels
213, 213*a* Openings
214, 214*a* Openings
215, 215*a* Hold-down device
250 Shaft element
251, 251*a* Shaft parts
252, 252*a* Shaft parts
253, 253*a* Guidance channels
254, 254*a* Guidance channels
255, 256 Longitudinal axis
257, 257*a* Slots
258, 258*a* Slots
259, 259*a* Hold-down device
260, 260*a* Hold-down device
261, 261*a* Holding webs
300 Element for cable guidance 301 First plug-on element
302 Second plug-on element
303 Latching tongue
304 Plug-on tongues
305 First limb
306 Second limb
307 Outer parts
400 Splice cassette
500 Term cassette
501 Bottom surface
502 Left-hand side wall
503 Right-hand side wall
504 Upper end wall
505 Lower end face
506 Holder
507 Adapter
508 Plug-in slots
509 Holding web
511 Input side
512 Output side
513 Glass fiber plug
514 Further glass fiber plug
515, 515a Elements
515b Holding tongue
516, 516a Shaft channel
517 Longitudinal axis
518, 518a Slots
519 Cable
520 Inlet/outlet section
521 Hold-down device
522 Undercut
523 Elements
524 Fan-out-elements
525 Elements
526 Guide ribs
527 Opening
528 Latching tabs
600 Term-splice cassette
601 Splice holder
602 Guide ribs
603 Guide body
604 Latching plate
605 Patch cord cable
606 Cable guidance element
b1, b2, b3, b4 Distances
700 Coupling element
701 Latching tongue
702 Latching tab

The invention claimed is:

1. A holder for at least one cassette, the holder having at least one shaft holder, a first shaft element attached to the at least one shaft holder, and at least one cassette, the at least one cassette being attached to the first shaft element such that the at least one cassette can pivot about a pivoting axis, the first shaft element having a guidance channel for guiding fibers into the at least one cassette, the cassette including a first element and a second element for rotatably mounting the cassette, each of the first and second elements having an elongated open shaft channel therein, the first and second elements being detachably connected to the first shaft element, the first shaft element is rotatably fixed relative to the shaft holder such that the guidance channel for the fibers is independent of the rotation of the at least one cassette along the central longitudinal axis, wherein the fibers do not rotate when the at least one cassette is pivoted, wherein the guidance channel of the first shaft element and the elongated open shaft channel of the first and second elements extend along a central longitudinal axis which is coaxial with the pivoting axis.

2. The holder as claimed in claim 1, wherein the first shaft element includes a first shaft part and a second shaft part which are coaxial.

3. The holder as claimed in claim 1, wherein the at least one cassette is a term cassette or a splice cassette or a combined term-splice cassette.

4. The holder as claimed in claim 2, wherein the elongated open shaft channel of the first element of the cassette receives the first shaft part of the first shaft element to be detachably connected thereto, and the elongated open shaft channel of the second element of the cassette receives the second shaft part of the first shaft element to be detachably connected thereto.

5. The holder as claimed in claim 1, wherein the first shaft element includes a first shaft part and a second shaft part which are coaxial, wherein the first shaft element and the second shaft element are detachably attached to the at least one shaft holder.

6. The holder as claimed in claim 1, wherein the guidance channel of the first shaft element defines a slot with a hold down device forming a constriction in the slot to restrain fibers therein.

7. The holder as claimed in claim 1, further comprising a combined term-splice cassette, the combined term-splice cassette comprising a term cassette and a splice cassette, with the term cassette being detachably connected to the splice cassette.

8. The holder as claimed in claim 1, wherein the at least one shaft holder has at least one attachment element, wherein the at least one shaft holder can be attached to a holding element or a coupling element by the at least one attachment element.

* * * * *